United States Patent
Takeuchi

(10) Patent No.: US 7,908,444 B2
(45) Date of Patent: Mar. 15, 2011

(54) STATUS HOLDING CIRCUIT AND STATUS HOLDING METHOD

(75) Inventor: Toshio Takeuchi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/656,935

(22) Filed: Feb. 19, 2010

(65) Prior Publication Data

US 2010/0213973 A1    Aug. 26, 2010

(30) Foreign Application Priority Data

Feb. 20, 2009   (JP) .................................. 2009-037595

(51) Int. Cl.
 *G06F 12/00*   (2006.01)
 *G06F 11/00*   (2006.01)
(52) U.S. Cl. ............. 711/156; 711/144; 714/48; 714/54
(58) Field of Classification Search .................. 711/109, 711/144, 156; 714/48–54, 57, 703, 723, 714/764, 765; 326/37, 38, 104
See application file for complete search history.

(56) References Cited

U.S. PATENT DOCUMENTS

| 4,853,929 | A | * | 8/1989 | Azuma et al. ................. 714/730 |
| 5,034,744 | A | * | 7/1991 | Obinata ........................ 341/118 |
| 5,426,682 | A | * | 6/1995 | Takatsu ........................... 377/80 |
| 5,724,537 | A | * | 3/1998 | Jones ................................ 711/1 |
| 6,035,126 | A | * | 3/2000 | Wise et al. ..................... 712/29 |
| 6,067,417 | A | * | 5/2000 | Wise et al. ..................... 712/18 |
| 6,209,069 | B1 | * | 3/2001 | Baltar ........................... 711/163 |
| 6,233,680 | B1 | * | 5/2001 | Bossen et al. .................... 713/1 |
| 6,446,179 | B2 | * | 9/2002 | Baltar ........................... 711/163 |

FOREIGN PATENT DOCUMENTS

JP    63-73435    4/1988

* cited by examiner

*Primary Examiner* — Vibol Tan
(74) *Attorney, Agent, or Firm* — McGinn IP Law Group, PLLC

(57) ABSTRACT

A status holding circuit includes status holding sections of M stages (M is an integer equal to or more than 2) connected in series. Each of the status holding sections includes: N latches (N is an integer equal to or more than 2) provided for N input signals to N input terminals, respectively; and a switch circuit configured to set a data to a $j^{th}$ latch of the N latches in an $i^{th}$ status holding section of the M-stage status holding sections when a status signal is supplied to a $j^{th}$ input terminal of the N input terminals at an $i^{th}$ timing.

9 Claims, 7 Drawing Sheets

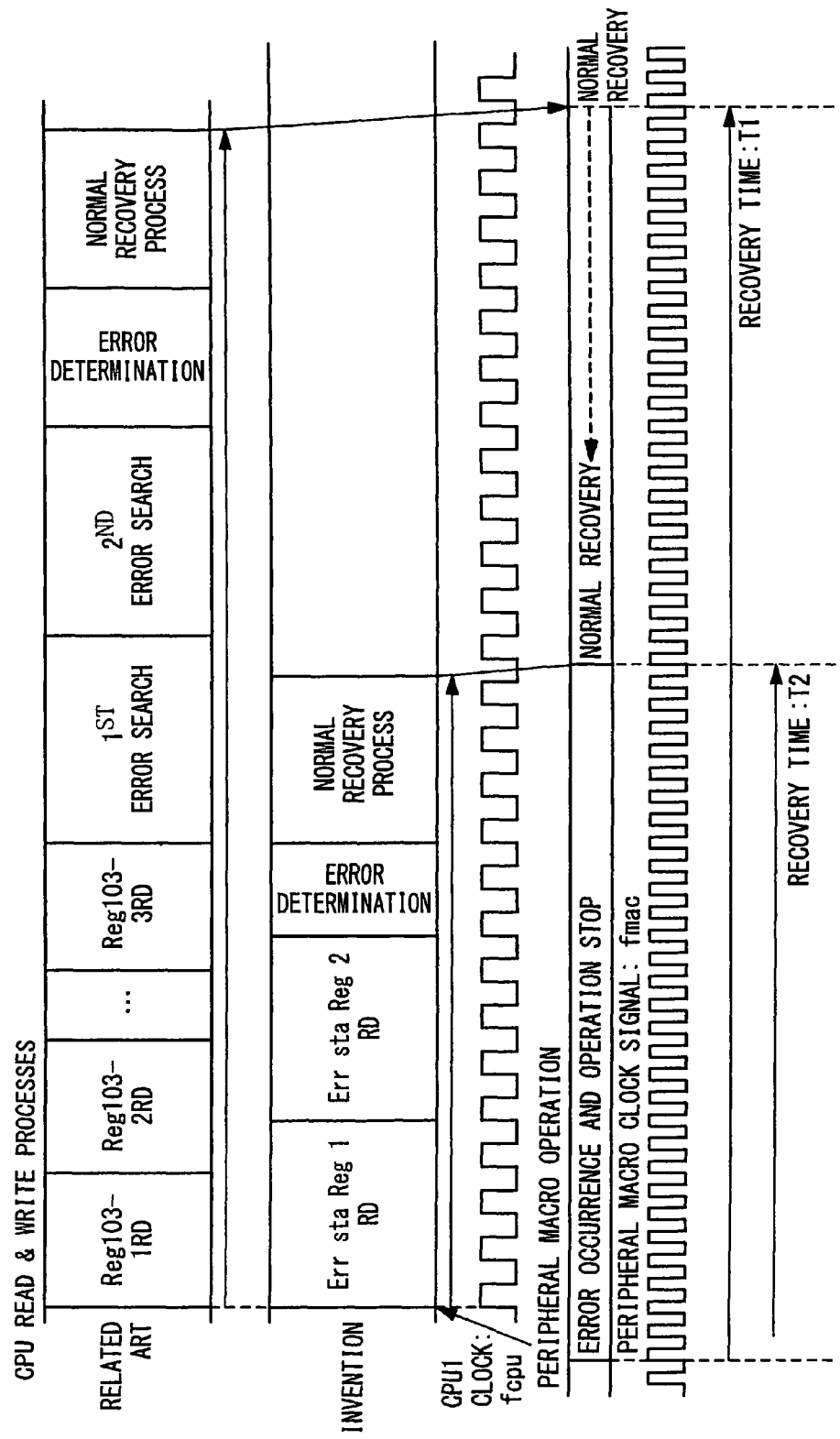

STATUS HOLDING CIRCUIT AND STATUS HOLDING METHOD

INCORPORATION BY REFERENCE

This patent application claims a priority on convention based on Japanese Patent Application No. 2009-037595. The disclosure thereof is incorporated herein by reference.

BACKGROUND OF THE INVENTION

1. Field of the Invention

The present invention relates to a technique of holding data related to a circuit operation.

2. Description of Related Art

In a one-chip microcomputer and a system LSI mounted with a peripheral function macro, a technique of holding data indicating events such as an operation status and an unordinary status (error) of the function macro is used. Flags indicating such data are collected at one location or registers of as smaller number as possible. When such an event has occurred, these flags are set to "1".

When a plurality of unordinary statuses (errors) have occurred at a same address, in order to recognize the details of unordinary statuses and adequately find a solution, it is desirable that an order is indicated in which the flags are set to "1".

As a related art, an error detecting circuit described in Japanese Patent Publication (JP-A-Showa 63-73435) is known. FIG. 1 shows a configuration of this error detecting circuit. The error detecting circuit includes SR latches holding an error occurrence state, a counter (timer) generating an error occurrence order; and registers (latches) receiving a count value when an error has occurred First, in response to a reset signal, error flip-flops 101-i (i=1 to n), a counter 102, and register 103-i are initially set to "0". If an error signal 111-1 is generated, the register 103-1 holds "0" while the registers 103-2 to 103-n are incremented to the value of "1". Next, if an error signal 111-2 is generated, the register 103-1 holds "0", the register 103-2 holds "1", and registers 3-3 to 3-n are set to "2". By repeating such an operation, the error occurrence order can be found even when a plurality of errors have occurred.

However, the above Japanese Patent Publication does not describe a method of reading the error occurrence order in detail. In the circuit described in the above Japanese Patent Publication, a CPU needs to read all the registers in order to completely recognize the error occurrence order. When a plurality of errors have occurred at a same time, a plurality of registers must hold a same value. Thus, an increase in the number of errors requires a long time for judgment on whether or not a system unordinary status is present and a recovery operation. For example, where a total number of errors is n, in order for the CPU to find a first error and a second error, a read command needs to be issued n times. Therefore, when a CPU clock frequency is relatively lower than a clock frequency of a peripheral macro, the above problem may become more remarkable.

SUMMARY OF THE INVENTION

In an aspect of the present invention, a status holding circuit includes: status holding sections of M stages (M is an integer equal to or more than 2) connected in series. Each of the status holding sections includes: N latches (N is an integer equal to or more than 2) provided for N input signals to N input terminals, respectively; and a switch circuit configured to set a data to a $j^{th}$ latch of the N latches in an $i^{th}$ status holding section of the M-stage status holding sections when a status signal is supplied to a $j^{th}$ input terminal of the N input terminals at an $i^{th}$ timing.

In another aspect of the present invention, a method of holding status signals in a status holding circuit comprising M-stage status holding sections (M is an integer equal to or more than 2) connected in series. Each of the status holding sections includes N latches (N is an integer equal to or more than 2) provided for N input signals to N input terminals, respectively; and a switch circuit. The method is achieved by setting an $i^{th}$ latch of the N latches in a $j^{th}$-stage status holding section when a first status signal is supplied to an input terminal of the $i^{th}$ latch in the $j^{th}$-stage status holding section at a $k^{th}$ timing (k is an integer equal to or smaller than M); and by negating the N latches in the $j^{th}$-stage status holding section by the switch circuit in the $j^{th}$-stage status holding section in response to the setting, so as not to receive any status signal.

According to the present invention, data of a j-kind of state signal generated at i-th timing is stored at a j-th latch of an $i^{th}$ status holding section, which makes it easy to find out the kind and generation timing of the state signal.

BRIEF DESCRIPTION OF THE DRAWINGS

The above and other objects, advantages and features of the present invention will be more apparent from the following description of certain embodiments taken in conjunction with the accompanying drawings, in which:

FIG. 7 is a diagram comparing data read-out procedures between the related art and the present embodiment.

DESCRIPTION OF PREFERRED EMBODIMENTS

Hereinafter, a status holding circuit according to the present invention will be described with reference to the attached drawings.

Figure 2:
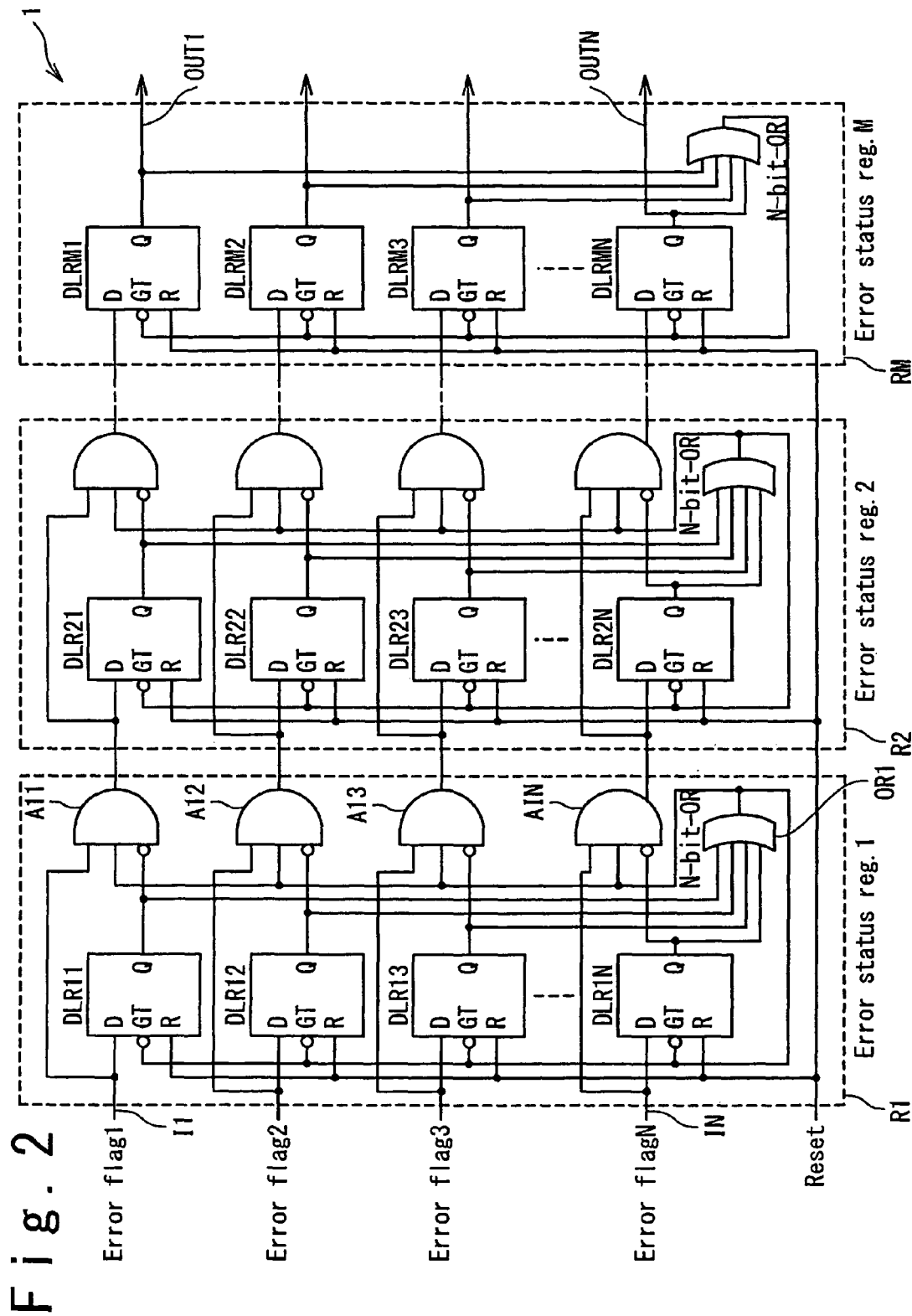
FIG. 2 shows a configuration of a status holding circuit according to the present invention.

FIG. 2 shows a configuration of a status holding circuit in the present embodiment. By registers of M stages each including N latch circuits, this status holding circuit holds N kinds of status signals indicating a device state, i.e., first to $M^{th}$ (where N≧M) status signals in occurrence order. the present embodiment, the state signal is described as an error signal indicating a kind of error. The status holding circuit includes logic gates that hold contents of all errors upon occurrence of the errors, and thereby the error occurrence order can be recognized through a sequentially read operation from the registers at fixed addresses.

The status holding circuit has N-bit registers (status holding sections) R1 to RM of the M stages (where M is an integer equal to or larger than 2). Each of the registers R1 to RM is identified by an address assigned individually. The M-stage registers are connected in series. The status holding sections R1 to RM have a same circuit configuration. The status holding section R1 of a first stage will be now described. The status holding section R1 includes N latches DLR11 to DLR1N disposed in parallel. Each of the latches DLR11 to DLR1N is a D-type latch with a reset terminal. The n latches DLR11 to DLR1N are respectively connected to signal lines I1 to IN to transfer N kinds of error signals (status signals).

The signal lines with a same configuration are respectively connected to the N latches DLR11 to DLR1N. The first latch DLR11 will be described in detail. The reset terminal of the latch DLR11 is connected to a reset signal line Reset. A data input terminal D of the latch DLR11 is connected to the signal line I1. A gate terminal GT of the latch DLR11 is connected to an output terminal of a logical summation circuit OR1 to be described later.

N logical product circuits A11 to A1N are provided for the N latches DLR11 to DLR1N in the same register R1, respectively. An output terminal Q of the latch DLR11 is connected to a first input terminal of the logic product circuit A11 corresponding to the latch DLR11. A signal to the first input terminal is inverted and received by the circuit A11. A second input terminal of the logic product circuit A11 is connected to the corresponding signal line I1 included in the N kinds of signal lines I1 to IN. A third input terminal of the logic product circuit A11 is connected to the output terminal of a logical summation circuit OR1. An output terminal of the logic product circuit A11 is connected to a data input terminal D of a latch DLR21 which is included in the N latches DLR21 to DLR2N of the register R2 at the next stage and which corresponds to this logical product circuit A11.

Respective output terminals of the N latches DLR11 to DLR1N in the same register R1 are connected to the input terminals of the same logical summation circuit OR1. That is, the logical summation circuit OR1 is an N-bit logical summation gate. The output terminal of the logical summation circuit OR1 is connected to the respective third input terminals of the N logical product circuits A11 to A1N in the register R1 at the same stage. The output terminal of the logical summation circuit OR1 is logically inverted and connected to the respective gate input terminals GT of the N latches DLR11 to DLR1N in the register R1 at the same stage. The N logical product circuits and one logical summation circuit included in each of the M-stage registers R1 to RM function as a switch circuit for holding the error signals supplied from the signal lines I1 to IN together with their input timing.

The registers R2 to RM at the second to $M^{th}$ stages have a same configuration as that of the register R1 at the first stage. They differ from the register R1 in the following points. In the registers R2 to RM at the second to $M^{th}$ stages, data input terminals D of the latches DLR21 to DLRMN and the second input terminals of logical product circuits A21 to AMN are connected to output terminals of the logical product circuits A11 to AMN at the previous stage, instead of the signal lines I1 to 1N. Output terminals of latches DLRM1 to DLRMN of the register RM at the $M^{th}$ stage are respectively connected to output signal lines OUT1 to OUTN of the status holding circuit 1.

Next, referring to FIGS. 3, 4 and 5 as an example (where M=2 and N=5), an operation of the status holding circuit 1 according to the present embodiment will be described. In this example, for five kinds of errors, a second error signal can be held together with their generation timing.

Figure 3:
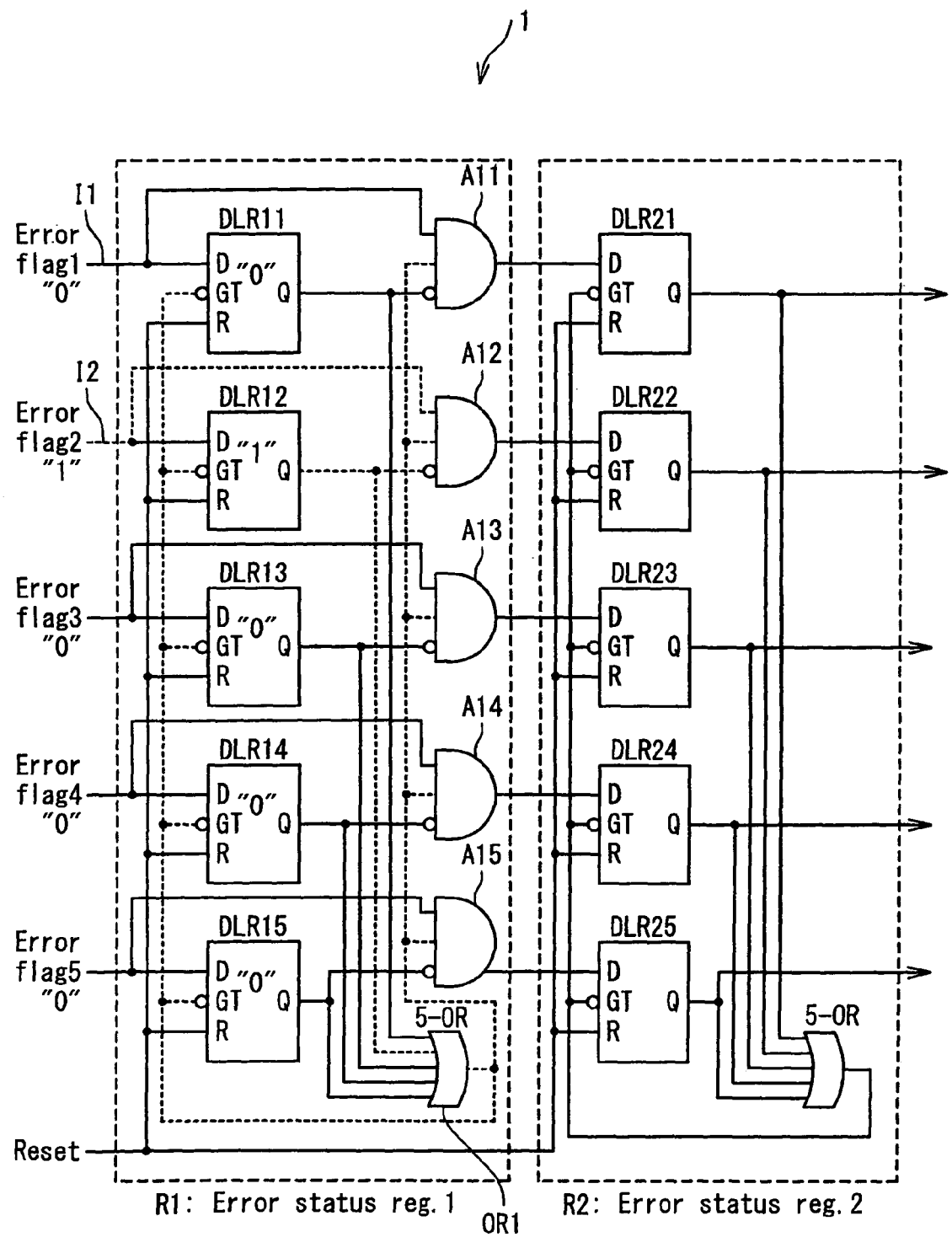
FIGS. 3 to 5 are diagrams illustrating an operation of the status holding circuit according to the present invention.

Next, FIG. 3 shows a case where the second kind of error has occurred at the first timing, that is, a case where the error signal is supplied to the second signal line I2. In initial setting, a rest signal is supplied to the input terminals R of all the latches, whereby values of flags inside all the latches DLR11 to DLR25 are set to "0". Furthermore, the gate terminals GT of all the latches DLR11 to DLR25 are set to "1", that is, into a gate-open state.

An error signal with the value of "1" is supplied to the signal line I2 at the first timing to indicate that an error (for example, high potential) has occurred. The error signal is supplied to an input terminal D of the second latch DLR12 of the register R1 at the first stage. Only the flag of the latch DLR12 is set to "1". An output signal with the value of "1" is outputted from the output terminal of the latch DLR 12.

The logical summation circuit OR1 realizes a negate function of negating the N latches DLR11 to DLR15 included in the register R1. More specifically, the output signal of the latch DLR12 is supplied to the input terminal of the logical summation circuit OR1. As a result, the output signal with the value of "1" is outputted from the output terminal of the logical summation circuit OR1. A value "0" obtained by inverting this output signal is supplied to the respective gate input terminals GT of the latches DLR11 to DLR15 of the register R1 at the first stage. As a result, the gates are closed, and a state of the register R1 at the first stage is held with no change for an error signal supplied at the second timing or thereafter. That is, the N latches DLR11 to DLR15 is disabled to receive another error signal. Through this operation, only the error signal generated at the first timing is recorded in the register R1 at the first stage.

Through the above operation, a transfer function is realized of transferring an error signal to one of the M-stage registers R1 to RM in accordance with input timing. Specifically, in response to the error signal at first timing, the logical value of the output signal of the logical summation circuit OR1 at the register R1 at the first stage changes from "0" to "1". As a result, the logical values of input signals of the third input terminals of the logical product circuits A11 to A15 change from "0" to "1". Through this switching, an error signal supplied at or before the first timing is not transferred to the second stage and the subsequent. An error signal supplied after the first timing is transferred to the second stage. Typically, when an error signal has been supplied to the status holding circuit 1 at $i^{th}$ timing, after this timing, the register Ri at an $i^{th}$ stage transfers the error signal to the register Ri+1 at the $(i+1)^{th}$ stage. As a result, when the error signal has been supplied to a $j^{th}$ input terminal included in N kinds of input terminals at the $i^{th}$ timing, i.e. the signal line Ij, the $j^{th}$ latch DLRij included in the register Ri at the $i^{th}$ stage is set.

Figure 4:
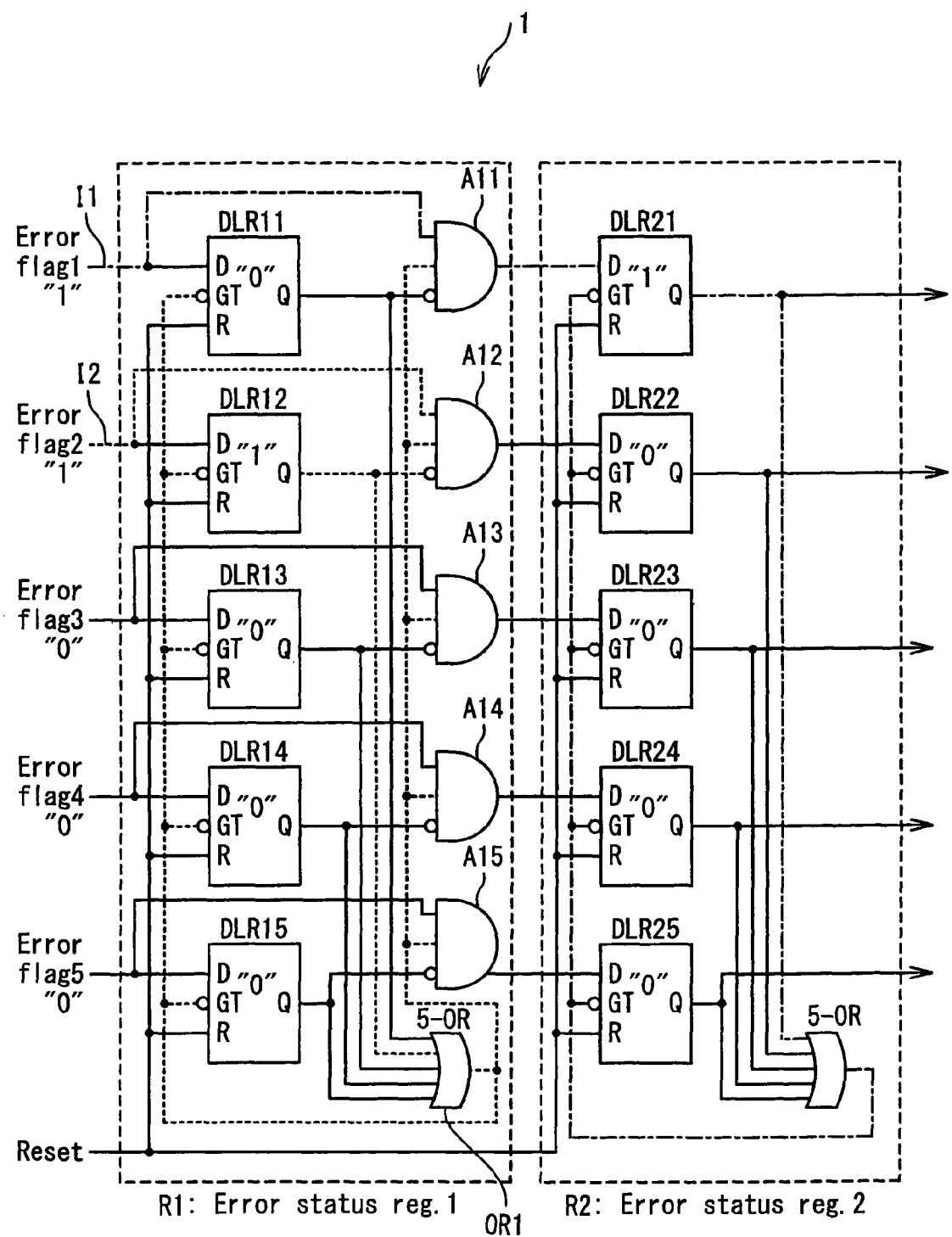

FIG. 4 shows the operation of the status holding circuit 1 when an error signal with the value of "1" is generated on the first signal line I1 at the second timing, following a state of FIG. 3. The error signal is supplied to the input terminal D of the first latch DLR11 of the register R1 at the first stage. Since the gate terminal GT of the latch DLR11 has been set to "0", i.e. an "OFF state", the value of "0" of the flag of the latch DLR11 does not change. The error signal is further supplied to the second input terminal of the logical product circuit A11 corresponding to the first signal line I1 in the register R1 at the first stage. At this point, the value of "1" obtained by inverting the value of "0" of the output signal from the output terminal Q of the latch DLR11 is supplied to the first input terminal of the logical product circuit A11. Furthermore, the signal with the value of "1" outputted from the output terminal of the logical summation circuit OR1 is supplied to the third input terminal of the logical product circuit A11, as described above. Thus, the logical product circuit A11 outputs the error signal with the value of "1" to the corresponding latch DLR21 of the register R2 at the second stage.

The error signal with the value of "1" is supplied to the data input terminal D of the latch DLR21 at the second register R2. The value of the flag of the latch DLR21 is set to "1". The output signal with the value of "1" is outputted from the output terminal Q of the latch DLR21. This output signal is supplied to the input terminal of the logical summation circuit OR2. The logical summation circuit OR2 outputs an output signal with the value of "1" from its output terminal. This output signal is logically inverted and supplied to gate input terminals GT of all the latches DIR21 to DIR25 of the register R2 at the second stage. As a result, even if any error signal has been supplied at the second timing or thereafter, data of the register R2 at the second stage is held with no change.

Figure 5:
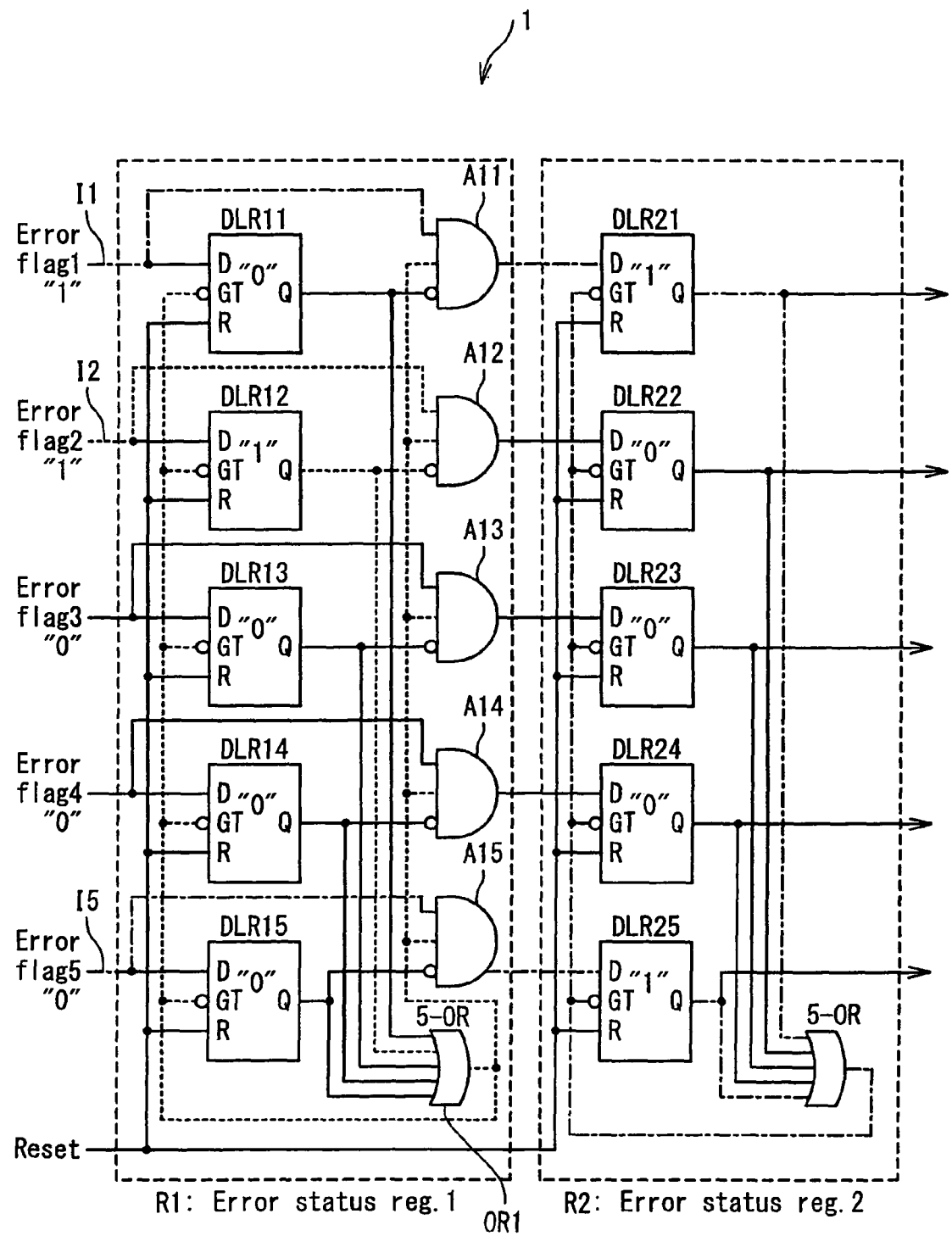

FIG. 5 shows the operation of the status holding circuit 1 when an error signal with the value of "1" is generated at the first signal line I1 and the fifth signal line 15 at the second timing, following the state of FIG. 3. The example of FIG. 5 differs from the example of FIG. 4 in a point that the error signal with the value of "1" is generated on the fifth signal line 15. In this case, the signal with the value of "1" is supplied to the second input terminal of the fifth logical product circuit A15 of the register R1 at the first stage. Since this error signal is supplied after the first timing, the logical product circuit A15 outputs the supplied signal with the value of "1" to the latch DLR25 of the register R2 at the second stage. The flag of the latch DLR25 is set to "1". The output terminal Q of the latch DLR25 outputs the output signal with the value of "1". This output signal is supplied to the logical summation circuit OR2. The logical summation circuit OR2 outputs the output signal with the value of "1". This output signal is logically inverted and supplied to the gate input terminals GT of all the latches DLR21 to DLR25 of the register R2 at the second stage. As a result, the values of the flags of the register R2 at the second stage are held at the second timing and thereafter. In this manner, data of two or more errors generated at the same timing are written into the register at a same address.

Figure 6:
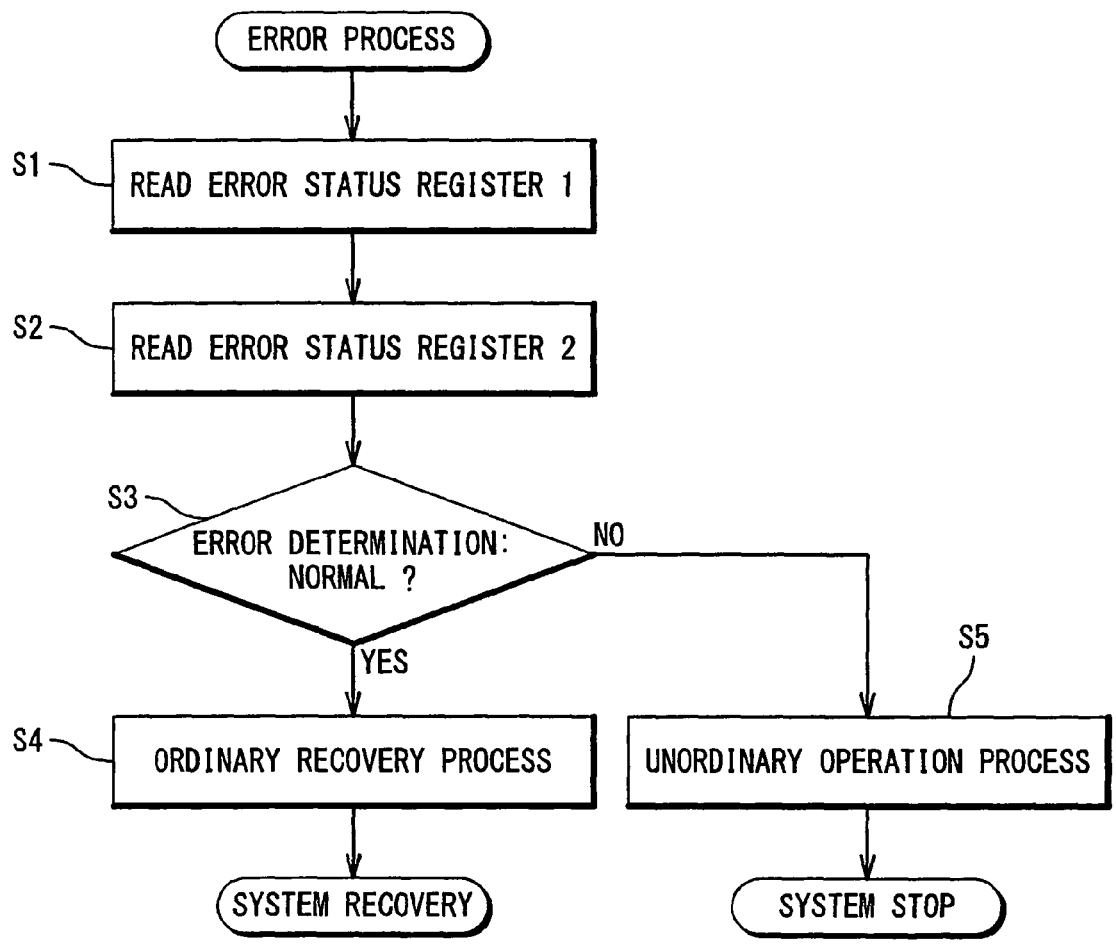
FIG. 6 is a flow chart showing an operation of reading error data in the present invention.

FIG. 6 shows a flow chart showing an operation of reading error data held in the status holding circuit 1 shown in FIGS. 3 to 5. A CPU operates based on a program, which has been loaded from a recording medium, describing a procedure shown in this flow chart, thereby executing an unordinary process for error signals. First, the CPU specifies an address identifying the register R1 (Error status reg. 1), and reads data held in the register R1 (step S1). This data indicates a kind of error occurrence at the first timing. In the example of FIG. 5, it is interpreted that the second kind of error has occurred at the first timing. Next, the CPU specifies an address identifying the register R2 (Error status reg. 2), and reads data held in the register R2 (step S2). This data indicates kinds of error occurring at the second timing. In the example of FIG. 5, it is interpreted that the first and fifth kinds of errors have occurred at the second timing. Next, the CPU judges whether or not the error occurrence order is normal (step S3). If the CPU judges that the error occurrence order is normal (Yes in step S3), the CPU executes an ordinary system recovery process (step S4). If the error occurrence order is judged to be not normal order (No in step S3), the CPU execute a process such as alarm display for an unordinary operation (step S5) and then stops the system.

Figure 1:
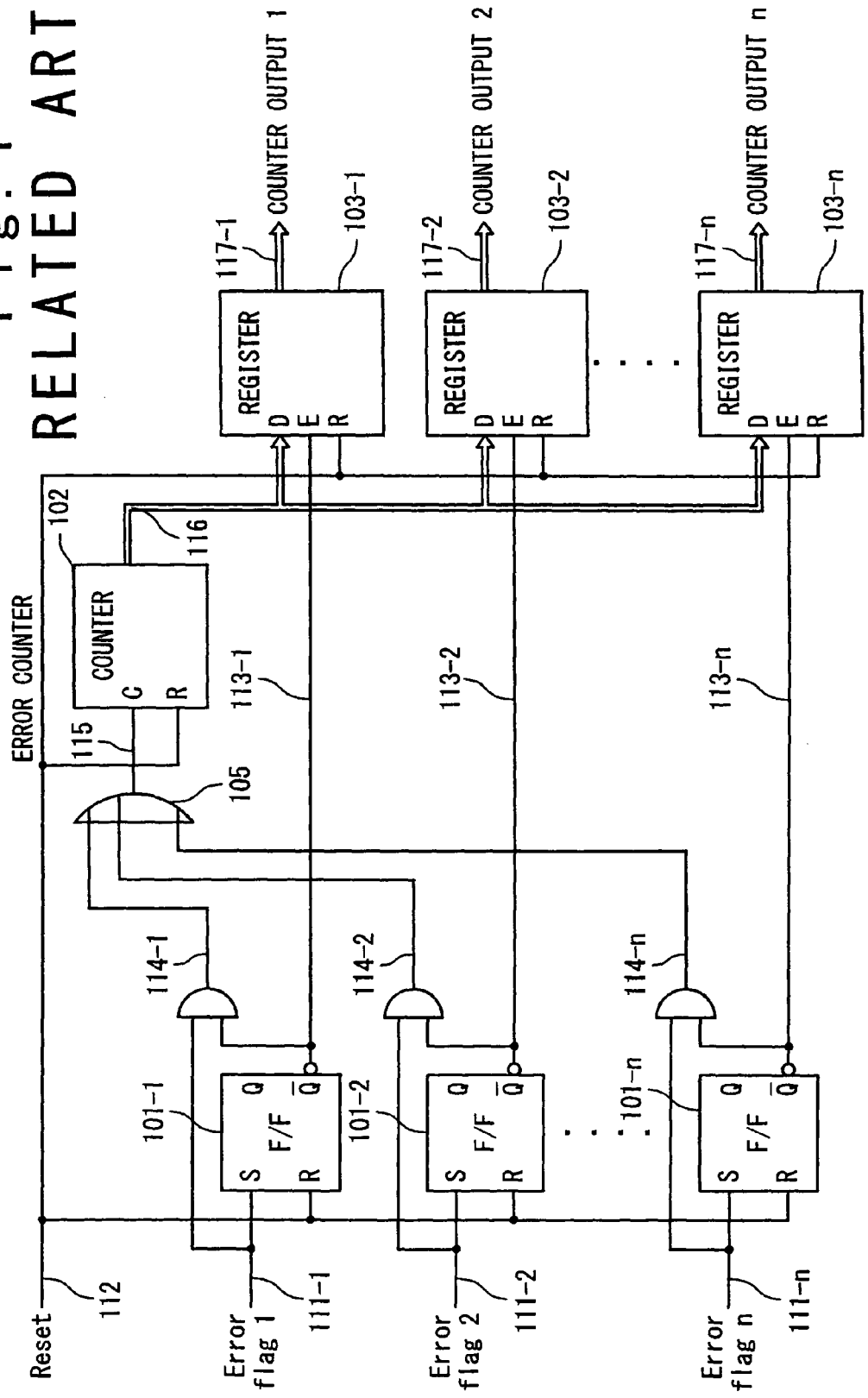
FIG. 1 shows a configuration of an error detecting circuit in a related art.

In the present embodiment, every time an error has occurred (a flag is set), statuses of all error flags are sequentially stored into the registers. Thus, compared to the related art, the number of times of read by the CPU to check occurrence order can be reduced. In the circuit of FIG. 1, the error occurrence order could not be judged until the last register 103-n is read. On the other hand, in the present embodiment, the error occurrence order can be recognized through two times of read operation. As a result, the judging operation of whether or not system is in the normal state and the recovery operation can be performed earlier.

In the present embodiment, the events and their occurrence timings can be recognized by reading specific registers by the CPU or an external unit. Since there is no limit except for a limit of $N \geq M$, on a relation between the number N of kinds of status signals or error signals to be sampled and the number M of times of occurrence of the signals, M and N can be freely set in accordance with system configuration of a one-chip microcomputer or a SOC (System on Chip) and a bit width and analysis depth of the CPU.

FIG. 7 is a diagram showing a comparing result in a data read procedure between the related art technique and the present embodiment. In the conventional technique, after the registers 103-1 to 103-n would have been sequentially read, an error occurrence at first time and an error occurrence at second time would be sequentially recognized. Then, error judgment would be performed, and the normal recovery processing would be performed. A time period from error occurrence to normal recovery is indicated as T1. Thus, in order to recognize error occurrence order, the time period T1 is required to read all the registers and search for the error occurrence order. This time period becomes great obstacle for a short-time recovery from an error in a peripheral macro. This becomes more remarkable with an increase in the number of errors. Specifically, this becomes more remarkable in a case where a CPU clock frequency fcpu is relatively lower than a peripheral macro clock frequency fmacro, since the recovery time T1 is extended.

On the other hand, in the present embodiment, the first register R1 is read, and the second register R2 is read. Next, error judgment is performed, and the normal recovery process is executed. A time period from error occurrence to normal recovery is indicated as T2. In the present embodiment, even when the number N of errors to be sampled increases, if N is up to a bit width of the CPU, the number of times of read operation by the CPU is only equivalent to the number M of error occurrence timings. Thus, in a case where a CPU clock frequency fcpu is lower than a peripheral macro clock frequency fmacro, the judgment operation on whether or not system is in the unordinary state and the recovery operation can be performed in a shorter time in the present embodiment.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A status holding circuit comprising:
   status holding sections of M stages (M is an integer equal to or more than 2) connected in series,
   wherein each of said status holding sections comprises:
   N latches (N is an integer equal to or more than 2) provided for N input signals to N input terminals, respectively; and
   a switch circuit configured to set a data to a $j^{th}$ latch of said N latches in an $i^{th}$ status holding section of said M-stage status holding sections when a status signal is supplied to a $j^{th}$ input terminal of said N input terminals at an $i^{th}$ timing.

2. The status holding circuit according to claim 1, wherein said switch circuit has a negate function of generating a signal to negate said N latches in said $i^{th}$ status holding section in response to the status signal for any of said N latches in said $i^{th}$ status holding section.

3. The status holding circuit according to claim 2, wherein said switch circuit comprises:
   a logical summation circuit having input terminals respectively connected with output terminals of said N latches in said $i^{th}$ status holding section and an output terminal connected with gate terminals of said N latches in said ith status holding section.

4. The status holding circuit according to claim 1, wherein said switch circuit has a transfer function of transferring the status signal supplied to said $i^{th}$ status holding section to a $(i+1)^{th}$ status holding section of said M-stage status holding sections at an $i^{th}$ timing and the subsequent when the status signal is supplied to said $i^{th}$ status holding section at an $i^{th}$ timing.

5. The status holding circuit according to claim 4, wherein said switch circuit comprises:
   a logical product circuit provided for each of said N latches in said $i^{th}$ status holding section and having a first input terminal connected with an output terminal of a corresponding one of said N latches, a second input terminal connected with a corresponding one of said N kinds of input terminals, and an output terminal connected with an input terminal of a corresponding one of said N latches in said $(i+1)^{th}$ status holding section.

6. A method of holding status signals in a status holding circuit comprising M-stage status holding sections (M is an integer equal to or more than 2) connected in series, wherein each of said status holding sections comprises:
   N latches (N is an integer equal to or more than 2) provided for N input signals to N input terminals, respectively; and a switch circuit,
   said method comprising:
   setting an $i^{th}$ latch of said N latches in a $j^{th}$-stage status holding section when a first status signal is supplied to an input terminal of said $i^{th}$ latch in said $j^{th}$-stage status holding section at a $k^{th}$ timing (k is an integer equal to or smaller than M); and
   negating said N latches in said $j^{th}$-stage status holding section by said switch circuit in said $j^{th}$-stage status holding section in response to said setting, so as not to receive any status signal.

7. The method according to claim 6, wherein said setting comprises:
   setting and holding a first logical state in said $i^{th}$ latch, said negating comprises:
   generating a negating signal by said switch circuit in response to the first logical state; and
   disabling said N latches in said $j^{th}$-stage status holding section to receive another status signal by said switch circuit in response to the negating signal.

8. The method according to claim 7, wherein said negating further comprises:
   transferring said another status signal generated at a $(k+1)^{th}$ timing to a $(j+1)^{th}$-stage status holding section by said switch circuit of said $j^{th}$-stage status holding section in response to the negating signal.

9. The method according to claim 6, wherein said setting further comprises:
   setting an $s^{th}$ latch (s is an integer equal to or smaller than N) of said N latches in said $j^{th}$-stage status holding section when a second status signal is supplied to an input terminal of said $s^{th}$ latch in said $j^{th}$-stage status holding section at the $k^{th}$ timing, together with the first status signal.

* * * * *